(12) United States Patent
Mie et al.

(10) Patent No.: US 7,709,157 B2
(45) Date of Patent: May 4, 2010

(54) NON-AQUEOUS ELECTROLYTE SECONDARY BATTERY AND ELECTROLYTE FOR THE SAME

(75) Inventors: Kumiko Mie, Tamana-gun (JP); Hizuru Koshina, Neyagawa (JP); Tooru Matsui, Fujiidera (JP); Masaki Deguchi, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1073 days.

(21) Appl. No.: 10/689,854

(22) Filed: Oct. 22, 2003

(65) Prior Publication Data

US 2004/0106047 A1    Jun. 3, 2004

(30) Foreign Application Priority Data

Oct. 23, 2002    (JP)    ............... 2002-308984

(51) Int. Cl.
*H01M 6/16*    (2006.01)
(52) U.S. Cl. ............ 429/337; 429/307; 429/331; 429/330; 429/199; 252/62.2
(58) Field of Classification Search ......... 429/337, 429/331, 330, 199, 307; 252/62.2
See application file for complete search history.

(56) References Cited

U.S. PATENT DOCUMENTS

| | | | |
|---|---|---|---|
| 5,569,561 A * | 10/1996 | Exnar et al. ............... | 429/337 |
| 5,916,475 A * | 6/1999 | Michot et al. ............. | 252/62.2 |
| 6,254,797 B1 | 7/2001 | Michot et al. | |
| 6,296,973 B1 * | 10/2001 | Michot et al. ............. | 429/330 |
| 6,503,657 B1 * | 1/2003 | Takami et al. ............. | 429/324 |
| 6,787,269 B2 | 9/2004 | Sekino | |
| 6,822,065 B1 * | 11/2004 | Sanchez et al. ........... | 429/199 |
| 6,861,175 B2 | 3/2005 | Sekino | |
| 6,864,016 B2 | 3/2005 | Ueda et al. | |
| 6,911,281 B2 | 6/2005 | Sonoda et al. | |
| 7,026,073 B2 * | 4/2006 | Ueda et al. ............... | 429/331 |
| 2001/0038949 A1 * | 11/2001 | Hatazaki et al. .......... | 429/337 |
| 2002/0064712 A1 | 5/2002 | Sekino | |
| 2002/0086216 A1 | 7/2002 | Sekino | |
| 2003/0118913 A1 | 6/2003 | Takami | |
| 2003/0134201 A1 * | 7/2003 | Sato et al. ............... | 429/231.8 |
| 2004/0097757 A1 | 5/2004 | Cernik | |
| 2006/0234131 A1 | 10/2006 | Takami | |
| 2006/0240328 A1 | 10/2006 | Takami | |

FOREIGN PATENT DOCUMENTS

| | | | |
|---|---|---|---|
| EP | 0 858 994 | * | 2/1998 |
| JP | 5-283086 | | 10/1993 |
| JP | 8511274 | | 11/1996 |
| JP | 11-339850 | | 12/1999 |
| JP | 11-354153 | | 12/1999 |
| JP | 11-354154 | | 12/1999 |
| JP | 11-354155 | | 12/1999 |
| JP | 2000-235868 | | 8/2000 |
| JP | 2001-126765 | | 5/2001 |
| JP | 2001-307774 | | 11/2001 |
| JP | 2002-015771 | | 1/2002 |
| JP | 2002-056827 | | 2/2002 |
| JP | 2002-110232 | | 4/2002 |
| JP | 2002-158035 | * | 5/2002 |
| JP | 2002-184462 | | 6/2002 |
| JP | 2002-280060 | | 9/2002 |
| JP | 2004-522681 | | 2/2004 |
| WO | 9526056 | | 9/1995 |
| WO | 0207248 | | 1/2002 |

OTHER PUBLICATIONS

Sonda et al. "New electrolytes for Lithium-ion secondary batteries", Proceedings-Electrochemical Society, vol. 2002-26 (Solid-state Ionic devices III), pp. 512-517, 2003.*
Chinese Office Action dated Jun. 3, 2005 with English translation.
Japanese Office Action dated May 28, 2009.

* cited by examiner

*Primary Examiner*—Laura S Weiner
(74) *Attorney, Agent, or Firm*—Dickinson Wright PLLC

(57) ABSTRACT

The present invention provides a safe non-aqueous electrolyte secondary battery with characteristics analogous to those of a conventional battery by minimizing battery expansion that causes damage to a device during high temperature exposure or storage. The non-aqueous electrolyte secondary battery comprises: (a) a chargeable and dischargeable positive electrode; (b) a negative electrode capable of absorbing and desorbing lithium; (c) a separator for preventing direct electron transfer between the positive electrode and the negative electrode; and (d) an non-aqueous electrolyte; the non-aqueous electrolyte comprising a non-aqueous solvent and a solute, the non-aqueous solvent comprising a lactone, the solute comprising lithium bis(fluorosulfonyl)imide represented by the formula (1):

$(F-O_2S-N-SO_2-F)Li.$

2 Claims, 1 Drawing Sheet

NON-AQUEOUS ELECTROLYTE SECONDARY BATTERY AND ELECTROLYTE FOR THE SAME

BACKGROUND OF THE INVENTION

In recent years, information electronic devices such as a personal computer, a cell phone and a PDA and audio-visual electronic devices such as a video camcorder and a minidisc player have been developed to be compact, light and cordless. With this development, demand is increasing for secondary batteries with high energy density as a power source for these devices. Under such circumstances, the commercialization of non-aqueous electrolyte secondary batteries with higher energy density than conventional secondary batteries such as lead acid battery, nickel cadmium battery and nickel metal hydride battery is proceeding.

Non-aqueous electrolyte secondary batteries as typified by a lithium ion secondary battery and a lithium ion polymer secondary battery use, as a positive electrode active material, a transition metal oxide with an average discharge potential of 3.5 to 4.0 V relative to that of metal lithium, such as lithium cobalt oxide ($LiCoO_2$), lithium nickel oxide ($LiNiO_2$) and spinel structure type lithium manganese oxide ($LiMn_2O_4$), or a solid solution material incorporating a plurality of transition metals ($LiCo_xNi_yMn_zO_2$, $Li(Co_aNi_bMn_c)_2O_4$). They are used singly or in combination thereof. These active materials are mixed with a conductive material and a binder, which is then applied onto a current collector made of, for example, aluminum, titanium or stainless steel, followed by rolling to give a positive electrode.

As for a negative electrode, a carbonaceous material capable of absorbing and desorbing lithium ions is commonly used. As the carbonaceous material, there are used artificial graphite, natural graphite, graphitized mesophase carbon made from coal pitch or petroleum pitch, non-graphitizing carbon (hard carbon), etc. They are used singly or in combination thereof. These carbonaceous materials are mixed with a binder and the like, which is then applied onto a current collector made of, for example, copper, iron or nickel, followed by rolling to give a negative electrode.

A negative electrode using a graphite material typically has an average potential allowing release of lithium ions which is 0.2 V lower than that of a negative electrode using non-graphitizing carbon (hard carbon). Accordingly, graphite materials are mostly used in the field which requires a high voltage and flat plateau in voltage characteristic.

A non-aqueous electrolyte is desired to be proof against an oxidizing atmosphere of the aforesaid positive electrode which discharges at a potential as high as 3.5 to 4.0 V relative to a potential of metal lithium and against a reducing atmosphere of the negative electrode which charges and discharges at a potential close to that of metal lithium. Currently, a non-aqueous electrolyte is prepared by dissolving lithium hexafluorophosphate ($LiPF_6$) in a non-aqueous solvent obtained by mixing ethylene carbonate with a high dielectric constant (hereinafter referred to as "EC") with a linear carbonate with low viscosity such as diethyl carbonate (hereinafter referred to as "DEC"), dimethyl carbonate (hereinafter referred to as "DMC"), or ethylmethyl carbonate (hereinafter referred to as "EMC").

Such non-aqueous electrolyte, however, contains a linear carbonate whose viscosity is low and boiling point is around 100° C.; therefore, it has a high vapor pressure at high temperatures, which may cause the battery itself to expand. Moreover, since $LiPF_6$, which is thermally unstable and prone to hydrolysis, is used as a solute, a gas is likely to occur inside the battery, promoting the expansion of the battery.

In view of the foregoing, studies have been carried out on a lithium salt as an alternative to $LiPF_6$. For example, the use of $LiBF_4$, lithium bis(perfluoromethylsulfonyl)imide ($LiN(SO_2CF_3)_2$, hereinafter referred to as "LiTFSI") or lithium bis(perfluoroethylsulfonyl)imide ($LiN(SO_2C_2F_5)_2$, hereinafter referred to as "LiBETI"), all of which are more thermally stable than $LiPF_6$, reduces the ionic conductivity of a non-aqueous electrolyte and thus lowers the discharge characteristic of a battery. Further, LiTFSI has the problem that it corrodes aluminum, which is mostly used as a current collector for a positive electrode, at a high potential of 3.7 V or higher relative to a potential of metal lithium. The use of LiBETI improves the corrosiveness; however, because it has a large molecular weight, it is likely to increase the viscosity of a non-aqueous electrolyte.

Recently, lithium bis(fluorosulfonyl)imide is being developed as an imide salt (see, for example, Japanese Laid-Open Patent Publication No. Hei 8-511274).

In order to prevent the vapor pressure from increasing at high temperatures, the use of a solvent with a high boiling point such as propylene carbonate (hereinafter referred to as "PC") or γ-butyrolactone (hereinafter referred to as "GBL") is considered instead of using the linear carbonate with a low viscosity and a low boiling point. GBL, however, reacts with $LiPF_6$ at high temperatures, thereby increasing the polarization resistance of a battery to decrease the charge and discharge characteristics.

BRIEF SUMMARY OF THE INVENTION

It is an object of the present invention to minimize battery expansion that causes damage to a device during high temperature exposure or storage, to provide a non-aqueous electrolyte secondary battery which is stable during high temperature exposure or storage, or to provide a non-aqueous electrolyte secondary battery with characteristics analogous to those of a conventional battery as well as with other preferable characteristics described here.

The present invention relates to a non-aqueous electrolyte secondary battery comprising: (a) a chargeable and dischargeable positive electrode; (b) a negative electrode capable of absorbing and desorbing lithium; (c) a separator for preventing direct electron transfer between the positive electrode and the negative electrode; and (d) a non-aqueous electrolyte; the non-aqueous electrolyte comprising a non-aqueous solvent and a solute, the non-aqueous solvent comprising a lactone, the solute comprising lithium bis(fluorosulfonyl)imide represented by the formula (1): (F—$O_2$S—N—$SO_2$—F)Li.

The non-aqueous electrolyte preferably further comprises an additive capable of forming a film on the positive electrode and/or the negative electrode.

The additive is preferably at least one selected from the group consisting of vinylene carbonate, vinylethylene carbonate, phenylethylene carbonate and propanesultone.

When the positive electrode comprises a current collector comprising aluminum, the solute preferably further comprises a second lithium salt containing a fluorine atom.

The second lithium salt is preferably at least one selected from the group consisting of $LiPF_m(C_kF_{2K+1})_{6-m}$ ($0 \leq m \leq 6$, $1 \leq k \leq 2$), $LiBF_n(C_jF_{2j+1})_{4-n}$ ($0 \leq n \leq 4$, $1 \leq j \leq 2$) and $LiAsF_6$. It should be noted that m, n, j and k are integers.

The non-aqueous solvent preferably further comprises ethylene carbonate and/or propylene carbonate.

The present invention is particularly advantageous when the positive electrode necessitates to be charged at a potential of 3.7 V or higher relative to that of metal lithium.

The lactone preferably comprises γ-butyrolactone.

The present invention further relates to the above non-aqueous electrolyte for a non-aqueous electrolyte secondary battery comprising: (a) a non-aqueous solvent comprising a lactone; and (b) a solute; the solute comprising lithium bis(fluorosulfonyl)imide represented by the formula (1): (F—O$_2$S—N—SO$_2$—F)Li.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
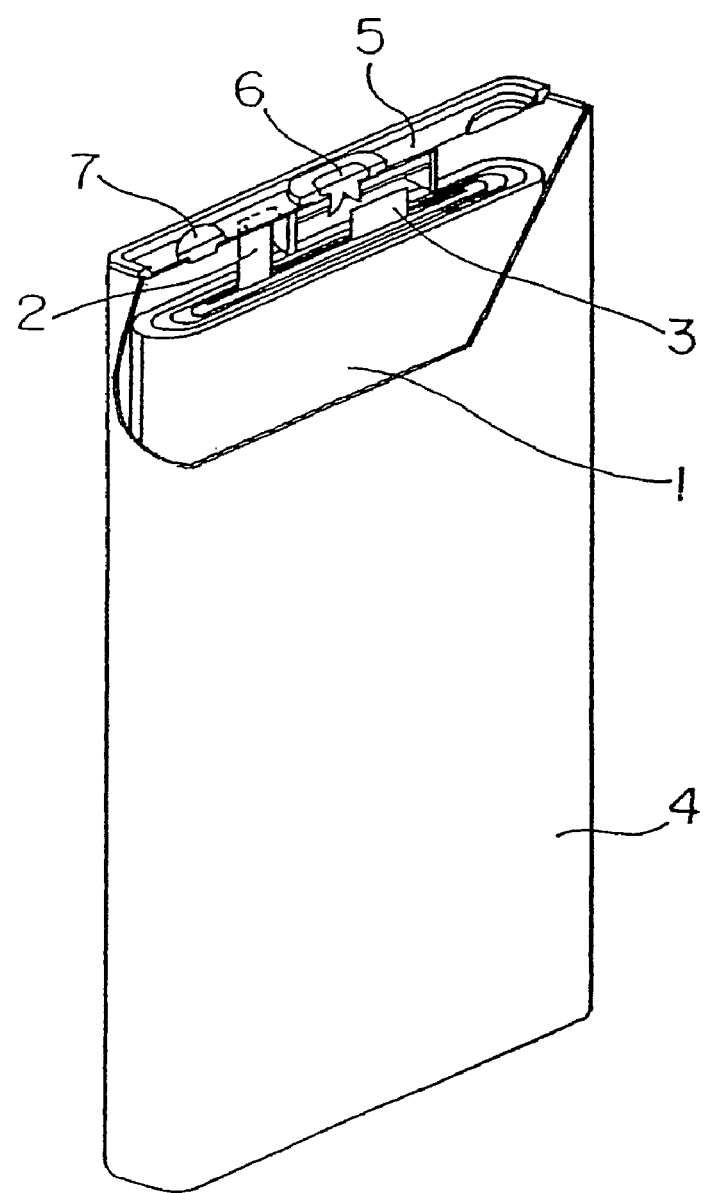
FIG. 1 is a partially cutaway oblique view of one embodiment of a non-aqueous electrolyte secondary battery of the present invention.

A non-aqueous electrolyte secondary battery of the present invention uses a non-aqueous electrolyte comprising, as a solvent, a lactone and, as a solute, lithium bis(fluorosulfonyl)imide represented by the formula (1): (F—O$_2$S—N—SO$_2$—F)Li (hereinafter referred to as "LiFSI"). LiFSI has a higher ionic conductivity than LiTFSI or LiPF$_6$. As just described, by using a lactone with a high melting point and a low vapor pressure as the non-aqueous solvent and using LiFSI instead of LiPF$_6$, it is possible to reduce gas generation during high temperature exposure or storage, to restrain battery expansion and to provide a non-aqueous electrolyte secondary battery with characteristics analogous to those of a conventional battery.

Since anion molecules produced when LiFSI dissociates into ions are smaller in size than those produced when other lithium imide salts do, the non-aqueous electrolyte containing LiFSI has a lower viscosity than one containing other imide salt such as LiBETI at a similar concentration. Moreover, LiFSI is more likely to dissociate into ions to produce lithium ions than LiPF$_6$ or the like because sulfonyl groups shield lithium ions. As a result, the ionic concentration of the non-aqueous electrolyte increases, thereby enhancing the ionic conductivity.

The present invention is particularly advantageous when the positive electrode of the non-aqueous electrolyte secondary battery comprises, singly or in combination, a transition metal oxide with an average discharge potential of 3.5 to 4.0 V relative to that of metal lithium, such as lithium cobalt oxide (LiCoO$_2$), lithium nickel oxide (LiNiO$_2$) and spinel structure type lithium manganese oxide (LiMn$_2$O$_4$), or a solid solution material incorporating a plurality of transition metals (LiCo$_x$Ni$_y$Mn$_z$O$_2$, Li(Co$_a$Ni$_b$Mn$_c$)$_2$O$_4$).

Examples of the lactone for use in the present invention include γ-butyrolactone (GBL), γ-valerolactone, α-methyl-γ-butyrolactone, etc. They may be used singly or in combination of two or more. Among them, particularly preferred is GBL.

When a current collector made of aluminum is used in the positive electrode, it is particularly advantageous to use LiFSI and a second lithium salt containing a fluorine atom as solutes for the non-aqueous electrolyte in order to inhibit corrosion of the current collector. Although the mechanism of inhibiting corrosion is not known, it is surmised that a second lithium salt containing a fluorine atom produces a small amount of fluorine ions to form a film of AlF$_3$ on the current collector.

The second lithium salt can be any salt, but is preferably at least one selected from the group consisting of LiPF$_m$(C$_k$F$_{2k+1}$)$_{6-m}$ (0≦m≦6, 1≦k≦2), LiBF$_n$(C$_j$F$_{2j+1}$)$_{4-n}$ (0≦n≦4, 1≦j≦2) and LiAsF$_6$. Among them, particularly preferred are LiPF$_6$ and LiBF$_4$.

The molar ratio of LiFSI to the second lithium salt is preferably "(LiFSI):(second lithium salt)=9:1 to 5:5."

Further, the concentration of the solute(s) in the non-aqueous electrolyte is preferably 0.5 to 1.5 mol/L, but is not limited to that range.

When a graphite material is used in the negative electrode, the non-aqueous solvent comprising a lactone is prone to be reductively decomposed on the negative electrode. Accordingly, it is preferred to add an additive capable of forming a film on the negative electrode. Alternatively, an additive capable of forming a film on the positive electrode can be added because the non-aqueous electrolyte may contain a component which decomposes on the positive electrode.

The negative electrode can also comprise, other than a graphite material such as artificial graphite and natural graphite, a carbonaceous material such as non-graphitizing carbon (hard carbon) or graphitized mesophase made from coal pitch or petroleum pitch. It is also possible to use a metal material such as Si, an Si—Ni alloy or an Sn—Ni alloy singly or in combination with the carbonaceous material in the negative electrode.

Preferred additives capable of forming a film on the positive and/or negative electrode include cyclic compound, phenylethylene carbonate (hereinafter referred to as "PhEC"), propanesultone (hereinafter referred to as "PS"), etc. They may be used singly or in combination of two or more. Examples of the cyclic compound include vinylene carbonate (hereinafter referred to as "VC"), vinyl ethylene carbonate (hereinafter referred to as "VEC"), etc. Among them, particularly advantageous are VC and VEC.

VEC is highly effective in reducing a side reaction because it forms a more dense film on the electrode than VC, but the battery with VEC exhibits lower rate characteristic and has poorer low temperature performance than the one with VC. PS is considered to offer a performance intermediate between VC and VEC.

The amount of the additive is preferably not more than 10 parts by weight per 100 parts by weight of the non-aqueous solvent, more preferably not more than 5 parts by weight per 100 parts by weight of the non-aqueous solvent. A large amount of the additive forms an excessively thick film, hindering the charge/discharge reaction. In order to obtain an adequate effect of the additive, the additive is preferably used in an amount of at least not less than 0.3 parts by weight per 100 parts by weight of the non-aqueous solvent.

For the purpose of improving the wettability between the non-aqueous electrolyte and an electrode and that between the non-aqueous electrolyte and a separator, the non-aqueous solvent may contain a solvent other than a lactone. The solvent other than a lactone is not specifically limited, but an aprotic solvent is preferred. Preferred examples for use include cyclic carbonate, linear (non-cyclic) carbonate, cyclic ether, linear (non-cyclic) ether, linear (non-cyclic) carboxylic acid ester, etc. Preferred cyclic carbonates are EC and PC, and preferred linear carbonates are EMC, DMC and DEC. A compound having a perfluoro group can also preferably be used as a solvent other than a lactone.

The content of the lactone in the non-aqueous solvent is preferably 50 to 100 wt %, more preferably 50 to 70 wt %. A non-aqueous solvent containing a lactone and at least a cyclic carbonate offers better performance than the one comprising the lactone singly.

The content of the cyclic carbonate in the non-aqueous solvent is preferably not more than 50 wt %. Further, the content of the linear carbonate in the non-aqueous solvent is not more than 20 wt %.

Particularly preferred composition of the non-aqueous solvent is, for example, 50 to 70 wt % of a lactone, 20 to 30 wt % of a cyclic carbonate and 5 to 30 wt % of a linear carbonate.

It is to be noted that the present invention is applicable to any type of non-aqueous electrolyte secondary battery such as cylindrical type, prismatic type, laminate type and coin type. The non-aqueous electrolyte may be a gel electrolyte obtained by being mixed with a polymer material. The use of such gel electrolyte gives a lithium ion polymer secondary battery.

EXAMPLE

The following specifically describes some aspects of the present invention based on EXAMPLEs.

Example 1

(i) Production of Positive Electrode

A paste type positive electrode active material mixture was prepared by mixing 3 parts by weight of acetylene black as a conductive material, 4 parts by weight of polyvinylidene fluoride (hereinafter referred to as "PVdF") as a binder and a proper amount of N-methyl-2-pyrrolidone (hereinafter referred to as "NMP") with 100 parts by weight of lithium cobalt oxide ($LiCoO_2$) as an active material. It is to be noted that PVdF was dissolved in NMP before its addition to other components. The obtained paste type positive electrode material mixture was applied onto the both surfaces of a titanium foil current collector, which was then dried and rolled out to give a positive electrode.

(ii) Production of Negative Electrode

A paste type negative electrode material mixture was prepared by mixing 3 parts by weight of styrene butadiene rubber as a binder in the form of an aqueous dispersion with 100 parts by weight of non-graphitizing carbon (Carbotron P manufactured by KUREHA CHEMICAL INDUSTRY CO., LTD.) as an active material. The obtained paste type negative electrode material mixture was applied onto the both surfaces of a copper foil current collector, which was then dried and rolled out to give a negative electrode.

(iii) Preparation of Non-aqueous Electrolyte

As a non-aqueous solvent, GBL was used singly. As a solute, LiFSI was used singly. In this example, a non-aqueous electrolyte was prepared by dissolving LiFSI in GBL at a concentration of 1 mol/L.

(iv) Assembly of Battery

A prismatic lithium-ion secondary battery as shown in FIG. 1 was assembled.

First, an electrode assembly 1 was constructed by spirally winding the positive and negative electrodes with a microporous separator film made of polyethylene with a thickness of 25 μm interposed therebetween to form it into an ellipse shape in cross section. In order to reduce moisture within the electrode assembly, the electrode assembly was dried in a vacuum drier at 60° C. for 12 hours to have a water content of not more than 50 ppm. The ends of a positive electrode lead 2 and a negative electrode lead 3 were welded to the positive and negative electrodes, respectively. An insulating ring made of polyethylene (not shown in the figure) was installed on the top of the electrode assembly 1, which was then housed in a thin prismatic battery case 4 made of aluminum, as shown in FIG. 1. The other end of the positive electrode lead 2 was spot-welded to an aluminum sealing plate 5. The other end of the negative electrode lead 3 was spot-welded to the underside of a negative electrode terminal 6 made of nickel provided in the center of the sealing plate 5 (not yet welded in FIG. 1). The opening end of the battery case 4 and the periphery of the sealing plate 5 were laser welded. Then, a predetermined amount of the non-aqueous electrolyte was fed from an inlet. Finally, a sealing stopper 7 made of aluminum was placed on the inlet, which was then laser welded to provide a hermetic seal.

Thus-obtained battery had a width of 30 mm, a height of 48 mm, a depth of 5.3 mm. Further, the battery had a designed capacity of 800 mAh.

The battery thus obtained was repeatedly charged and discharged in an atmospheric temperature of 20° C. Specifically, the battery was first charged at a constant current of 0.16 A up to a battery voltage of 4.2 V. After a 20 minute interval, the battery was then discharged at a discharge current of 0.16 A with an end-of-discharge voltage set at 3.0 V. This cycle was repeated. Subsequently, the battery was charged at a charge current of 0.16 A up to a battery voltage of 4.1 V. This battery was referred to as "Battery of EXAMPLE 1".

Example 2

A non-aqueous electrolyte was prepared in the same manner as in EXAMPLE 1 except that 2 parts by weight of VC was added as an additive to 100 parts by weight of GBL. A battery analogous to that of EXAMPLE 1 was produced, except that the obtained non-aqueous electrolyte was used and flake graphite was used as a negative electrode active material instead of the non-graphitizing carbon (hard carbon). The obtained battery was referred to as "Battery of EXAMPLE 2".

Example 3

As a non-aqueous solvent, GBL was used singly. As a solute, LiFSI and $LiPF_6$ were used at a molar ratio of 7:3. In this example, LiFSI and $LiPF_6$ were dissolved in GBL at a concentration of 0.7 mol/L and 0.3 mol/L, respectively, to give a non-aqueous electrolyte. A battery analogous to that of EXAMPLE 2 was produced, except that the obtained non-aqueous electrolyte was used and an aluminum foil was used as a positive electrode current collector instead of the titanium foil. The obtained battery was referred to as "Battery of EXAMPLE 3".

Example 4

As a non-aqueous solvent, a mixture solvent of 30 wt % of EC and 70 wt % of GBL was used. As solutes, LiFSI and $LiPF_6$ were used at a molar ratio of 7:3. In this example, LiFSI and $LiPF_6$ were dissolved in the above mixture solvent at a concentration of 0.7 mol/L and 0.3 mol/L, respectively. Then, 2 parts by weight of VC was added as an additive to 100 parts by weight of the mixture solvent to give a non-aqueous electrolyte. A battery analogous to that of EXAMPLE 3 was produced except that the obtained non-aqueous electrolyte was used. The obtained battery was referred to as "Battery of EXAMPLE 4".

Example 5

A non-aqueous electrolyte was prepared in the same manner as in EXAMPLE 1 except that 2 parts by weight of VEC was added as an additive to 100 parts by weight of GBL. A battery analogous to that of EXAMPLE 1 was produced except that the obtained non-aqueous electrolyte was used and flake graphite was used as a negative electrode active material instead of the non-graphitizing carbon (hard carbon). The obtained battery was referred to as "Battery of EXAMPLE 5".

Example 6

A non-aqueous electrolyte was prepared in the same manner as in EXAMPLE 1 except that 2 parts by weight of PS was added as an additive to 100 parts by weight of GBL. A battery analogous to that of EXAMPLE 1 was produced except that the obtained non-aqueous electrolyte was used and flake graphite was used as a negative electrode active material instead of the non-graphitizing carbon (hard carbon). The obtained battery was referred to as "Battery of EXAMPLE 6".

Example 7

As a non-aqueous solvent, a mixture solvent of 30 wt % of EC and 70 wt % of GBL was used. As a solute, LiFSI and $LiPF_6$ were used at a molar ratio of 7:3. In this example, LiFSI and $LiPF_6$ were dissolved in the above mixture solvent at a concentration of 0.7 mol/L and 0.3 mol/L, respectively. Then, 2 parts by weight of VEC was added as an additive to 100 parts by weight of the mixture solvent to give a non-aqueous electrolyte. A battery analogous to that of EXAMPLE 3 was produced except that the obtained non-aqueous electrolyte was used. The obtained battery was referred to as "Battery of EXAMPLE 7".

Example 8

As a non-aqueous solvent, a mixture solvent of 30 wt % of EC and 70 wt % of GBL was used. As a solute, LiFSI and $LiPF_6$ were used at a molar ratio of 7:3. In this example, LiFSI and $LiPF_6$ were dissolved in the above mixture solvent at a concentration of 0.7 mol/L and 0.3 mol/L, respectively. Then, 2 parts by weight of PS was added as an additive to 100 parts by weight of the mixture solvent to give a non-aqueous electrolyte. A battery analogous to that of EXAMPLE 3 was produced except that the obtained non-aqueous electrolyte was used. The obtained battery was referred to as "Battery of Example 8".

Example 9

A battery analogous to that of EXAMPLE 1 was produced except that GVL was used as a non-aqueous solvent instead of GBL. The obtained battery was referred to as "Battery of EXAMPLE 9".

Example 10

A battery analogous to that of EXAMPLE 1 was produced except that a mixture solvent of 30 wt % of PC and 70 wt % of GVL was used as a non-aqueous solvent instead of GBL. The obtained battery was referred to as "Battery of EXAMPLE 10".

Example 11

As a non-aqueous solvent, GBL was used singly. As a solute, LiFSI and $LiBF_4$ were used at a molar ratio of 7:3. In this example, LiFSI and $LiBF_4$ were dissolved in GBL at a concentration of 0.7 mol/L and 0.3 mol/L, respectively, to give a non-aqueous electrolyte. A battery analogous to that of EXAMPLE 3 was produced except that the obtained non-aqueous electrolyte was used. The obtained battery was referred to as "Battery of EXAMPLE 11".

Comparative Example 1

As a non-aqueous solvent, a mixture solvent of 25 wt % of EC and 75 wt % of EMC was used. As a solute, $LiPF_6$ was used singly. In this example, $LiPF_6$ was dissolved in the above mixture solvent at a concentration of 1 mol/L. Then, 2 parts by weight of VC was added as an additive to 100 parts by weight of the mixture solvent to give a non-aqueous electrolyte. A battery analogous to that of EXAMPLE 3 was produced except that the obtained non-aqueous electrolyte was used. The obtained battery was referred to as "Battery of COMPARATIVE EXAMPLE 1".

Comparative Example 2

As a non-aqueous solvent, GBL was used singly. As a solute, $LiPF_6$ was used singly. In this example, $LiPF_6$ was dissolved in GBL at a concentration of 1 mol/L. Then, 2 parts by weight of VC was added as an additive to 100 parts by weight of the GBL to give a non-aqueous electrolyte. A battery analogous to that of EXAMPLE 3 was produced except that the obtained non-aqueous electrolyte was used. The obtained battery was referred to as "Battery of COMPARATIVE EXAMPLE 2".

Comparative Example 3

As a non-aqueous solvent, GBL was used singly. As a solute, LiBETI was used singly. In this example, LiBETI was dissolved in GBL at a concentration of 1 mol/L. Then, 2 parts by weight of VC was added as an additive to 100 parts by weight of the GBL to give a non-aqueous electrolyte. A battery analogous to that of EXAMPLE 3 was produced except that the obtained non-aqueous electrolyte was used. The obtained battery was referred to as "Battery of COMPARATIVE EXAMPLE 3".

Comparative Example 4

As a non-aqueous solvent, a mixture solvent of 30 wt % of EC and 70 wt % of GBL was used. As a solute, $LiPF_6$ was used singly. In this example, $LiPF_6$ was dissolved in the above mixture solvent at a concentration of 1 mol/L. Then, 2 parts by weight of VC was added as an additive to 100 parts by weight of the mixture solvent to give a non-aqueous electrolyte. A battery analogous to that of EXAMPLE 3 was produced except that the obtained non-aqueous electrolyte was used. The obtained battery was referred to as "Battery of COMPARATIVE EXAMPLE 4".

Comparative Example 5

As a non-aqueous solvent, a mixture solvent of 25 wt % of EC and 75 wt % of EMC was used. As a solute, LiFSI was used singly. In this example, LiFSI was dissolved in the above mixture solvent at a concentration of 1 mol/L. Then, 2 parts by weight of VC was added as an additive to 100 parts by weight of the mixture solvent to give a non-aqueous electrolyte. A battery analogous to that of EXAMPLE 2 was produced except that the obtained non-aqueous electrolyte was used. The obtained battery was referred to as "Battery of COMPARATIVE EXAMPLE 5".

A storage test as well as a high temperature exposure test was carried out as follows.

Each of Batteries were discharged at a discharge current of 0.8 A with an end-of-discharge voltage set at 3.0 V in an atmosphere of 20° C. Thereafter, a constant current/constant voltage charge was performed for 2 hours with a maximum current of 0.56 A and a predetermined voltage of 4.2 V. The charge capacity obtained at this time was referred to as nominal capacity.

Capacity recovery rate after high temperature storage was measured as follows.

Each of Batteries charged up to the nominal capacity was discharged at a discharge current of 0.8 A with an end-of-discharge voltage set at 3.0 V in an atmosphere of 0 or 20° C., and its discharge capacity was then measured. The battery was subjected to a constant current/constant voltage charge for 2 hours with a maximum current of 0.56 A and a predetermined voltage of 4.2 V, which was then stored in an ambient temperature of 85° C. for 3 days. The battery after storage was discharged at a discharge current of 0.8 A with an end-of-discharge voltage set at 3.0 V in an atmosphere of 0 or 20° C.

Table 1 shows discharge capacity before storage, discharge capacity after high temperature storage and battery expansion after high temperature storage (i.e. increased fraction of thickness).

because the use of GBL as a solvent lowered the vapor pressure of the non-aqueous electrolyte and the reactivity of the electrolyte with the active material.

Moreover, both Batteries of EXAMPLE 4 and Comparative Example 4 had a small battery expansion because they used the mixture solvent of EC and GBL. As for electric characteristics, Battery of EXAMPLE 4 with LiFSI as a solute exhibited superior electric characteristics.

Battery of EXAMPLE 3 had a small battery expansion and exhibited a relatively good capacity even after high temperature storage.

It is to be noted that Batteries of EXAMPLES 1 and 2 can use a current collector made of stainless steel or the like as a positive electrode current collector instead of using the titanium foil. Moreover, favorable characteristics can also be expected when they are applied to coin type batteries.

Since $LiCoO_2$ with a full charge potential as high as 4.3 V was used as a positive electrode active material in EXAMPLEs, it is surmised that the use of $LiPF_6$ containing a fluorine atom with LiFSI largely contributed to the improvement of the battery characteristics of EXAMPLES 3 and 4. Likewise, even in the case of using an aluminum foil as the positive electrode current collector, when the positive electrode active material with a charge potential of less than 3.7 V relative to that of a metal lithium is employed, it is presumed that the presence or absence of $LiPF_6$ does not affect battery characteristics. The same can be said in the case of using a lithium salt containing a fluorine atom other than $LiPF_6$.

Battery of EXAMPLE 4 had a small battery expansion and its electric characteristics were the best among all Batteries. It is presumed that the use of VC as an additive and the addition of EC to the non-aqueous solvent, as well as the use of LiFSI

TABLE 1

| | Composition of electrolyte | | | Battery characteristics | | | | |
|---|---|---|---|---|---|---|---|---|
| | | | | Capacity before storage (mAh) | | Recovery capacity after storage (mAh) | | Battery expansion |
| | Non-aqueous solvent | Li-salt | Additive | 20° C. | 0° C. | 20° C. | 0° C. | (mm) |
| Ex. 1 | GBL | LiFSI | None | 798 | 702 | 488 | 244 | 0.133 |
| Ex. 2 | GBL | LiFSI | VC | 809 | 719 | 501 | 323 | 0.121 |
| Ex. 3 | GBL | LiFSI + $LiPF_6$ | None | 809 | 713 | 498 | 248 | 0.126 |
| Ex. 4 | EC + GBL | LiFSI + $LiPF_6$ | VC | 816 | 720 | 550 | 354 | 0.130 |
| Ex. 5 | GBL | LiFSI | VEC | 805 | 678 | 546 | 221 | 0.115 |
| Ex. 6 | GBL | LiFSI | PS | 798 | 695 | 492 | 298 | 0.130 |
| Ex. 7 | EC + GBL | LiFSI + $LiPF_6$ | VEC | 807 | 686 | 535 | 317 | 0.122 |
| Ex. 8 | EC + GBL | LiFSI + $LiPF_6$ | PS | 801 | 702 | 503 | 322 | 0.134 |
| Ex. 9 | GVL | LiFSI | None | 795 | 694 | 436 | 202 | 0.135 |
| Ex. 10 | PC + GVL | LiFSI | None | 803 | 703 | 464 | 221 | 0.133 |
| Ex. 11 | GBL | LiFSI + $LiBF_4$ | None | 806 | 681 | 421 | 198 | 0.127 |
| Comp. Ex. 1 | EC + EMC | $LiPF_6$ | VC | 832 | 780 | 640 | 415 | 0.907 |
| Comp. Ex. 2 | GBL | $LiPF_6$ | VC | 798 | 680 | 339 | 20 | 0.139 |
| Comp. Ex. 3 | GBL | LiBETI | VC | 787 | 625 | 164 | 0 | 0.152 |
| Comp. Ex. 4 | EC + GBL | $LiPF_6$ | VC | 802 | 648 | 419 | 40 | 0.135 |
| Comp. Ex. 5 | EC + EMC | LiFSI | VC | 835 | 786 | 650 | 431 | 0.851 |

Battery of Comparative Example 1 exhibited excellent electric characteristics after high temperature storage. However, it expanded considerably and therefore its battery expansion was almost 1 mm. This expansion may seriously damage the exterior of an electronic device.

The expansion of Battery of Comparative Example 2 using GBL singly as a non-aqueous solvent was only about 17% of that of COMPARATIVE EXAMPLE 1. Presumably, this is and $LiPF_6$, contributed to this. To be more specific, it is surmised that the reduction decomposition of GBL on the negative electrode was thoroughly suppressed in Battery of EXAMPLE 4. The additives are advantageous particularly when a graphite material is used in the negative electrode. When a graphite material has a high crystallinity, it is advantageous to use these additives in order to improve the initial charge/discharge efficiency.

As described above, the present invention can provide a safe non-aqueous electrolyte secondary battery with characteristics analogous to those of a conventional battery by minimizing battery expansion that causes damage to a device during high temperature exposure or storage.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising:
   (a) a chargeable and dischargeable positive electrode, said positive electrode necessitates to be charged at a potential of 3.7 V or higher relative to a potential of metal lithium and comprises a current collector comprising aluminum;
   (b) a negative electrode to absorb and desorb lithium;
   (c) a separator to prevent direct electron transfer between said positive electrode and said negative electrode; and
   (d) a non-aqueous electrolyte;
   said non-aqueous electrolyte comprising a non-aqueous solvent and a solute,
   said non-aqueous solvent consisting of a lactone comprising γ-butyrolactone, and
   said solute comprising lithium bis(fluorosulfonyl)imide represented by the formula (1):
   $(F-O_2S-N-SO_2-F)Li$, and a second lithium salt, wherein:
   said second lithium salt containing a fluorine atom, and
   said second lithium salt is at least one selected from the group consisting of $LiPF_m(C_kF_{2k+1})_{6-m}$ ($0 \leq m \leq 6$, $1 \leq k \leq 2$), and $LiBF_n(C_jF_{2j+1})_{4-n}$ ($0 \leq n \leq 4$, $1 \leq j \leq 2$).

2. A non-aqueous electrolyte for a non-aqueous electrolyte secondary battery comprising:
   (a) a non-aqueous solvent, said non-aqueous solvent consisting of a lactone which comprises γ-butyrolactone;
   (b) an additive comprising phenylethylene carbonate; and
   (c) a solute, said solute comprising lithium bis(fluorosulfonyl)imide represented by the formula (1): $(F-O_2S-N-SO_2-F)Li$, and a second lithium salt, wherein:
   said second lithium salt containing a fluorine atom, and
   said second lithium salt is at least one selected from the group consisting of $LiPF_m(C_kF_{2k+1})_{6-m}$ ($0 \leq m \leq 6$, $1 \leq k \leq 2$), and $LiBF_n(C_jF_{2j+1})_{4-n}$ ($0 \leq n \leq 4$, $1 \leq j \leq 2$).

* * * * *